(12) United States Patent
Oakes, III et al.

(10) Patent No.: US 8,712,801 B1
(45) Date of Patent: Apr. 29, 2014

(54) SYSTEMS AND METHODS FOR AUTOMATED INSTITUTIONAL PROCESSING OF PAYMENTS

(75) Inventors: Charles Lee Oakes, III, Boerne, TX (US); Rickey Dale Burks, Boerne, TX (US); Randy Ray Morlen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1462 days.

(21) Appl. No.: 11/782,564

(22) Filed: Jul. 24, 2007

(51) Int. Cl.
*G06Q 40/08* (2012.01)

(52) U.S. Cl.
USPC .................................................. 705/4

(58) Field of Classification Search
USPC .................................................. 705/4
See application file for complete search history.

(56) References Cited

U.S. PATENT DOCUMENTS

| | | | |
|---|---|---|---|
| 4,491,725 A * | 1/1985 | Pritchard | 705/2 |
| 4,689,478 A | 8/1987 | Hale et al. | 235/380 |
| 4,739,295 A | 4/1988 | Hayashi et al. | 235/379 |
| 4,868,376 A | 9/1989 | Lessin et al. | 235/492 |
| 5,950,169 A | 9/1999 | Borghesi et al. | 705/4 |
| 7,689,507 B2 | 3/2010 | Hung et al. | |
| 2001/0041993 A1 * | 11/2001 | Campbell | 705/4 |
| 2002/0004731 A1 * | 1/2002 | Belben | 705/4 |
| 2002/0095317 A1 * | 7/2002 | McCabe | 705/4 |
| 2003/0069858 A1 | 4/2003 | Kittlitz et al. | |
| 2004/0049411 A1 * | 3/2004 | Suchard et al. | 705/4 |
| 2004/0148204 A1 * | 7/2004 | Menendez | 705/4 |
| 2005/0044021 A1 | 2/2005 | Schafer | |
| 2005/0182714 A1 | 8/2005 | Nel | |
| 2006/0235746 A1 * | 10/2006 | Hammond et al. | 705/14 |
| 2006/0242036 A1 | 10/2006 | Walker et al. | |
| 2007/0067191 A1 * | 3/2007 | Loveland | 705/4 |
| 2008/0133753 A1 | 6/2008 | Clark | |
| 2008/0172257 A1 * | 7/2008 | Bisker et al. | 705/4 |

* cited by examiner

*Primary Examiner* — Leland Marcus
(74) *Attorney, Agent, or Firm* — Perkins Coie LLP

(57) ABSTRACT

Various mechanisms are provided herein for automated institutional processing of payments. For example, fund can be transferred from one party to another party by transfer of funds from a static account into a dynamically created transaction account. Such a transfer can have additional features, including the refunding of the transfer funds and revocation thereof. According to another example, insurance claims can be automatically processed by transferring funds when claims are filed (with or without evidentiary documents). Such transfers can then be validated afterwards. Thus, when claims are received, they can be quickly examined for the relevant fields, such as claim amount, and then the amount can be disbursed in a matter of minutes after receiving a claim submission. Such disbursement, moreover, can be governed according to various heuristics, including the trustworthiness of claimants and rules regarding maximum disbursement amounts.

20 Claims, 7 Drawing Sheets

SYSTEMS AND METHODS FOR AUTOMATED INSTITUTIONAL PROCESSING OF PAYMENTS

CROSS REFERENCE TO RELATED APPLICATIONS

This application is related to subject matter disclosed in the following commonly assigned application: U.S. patent application Ser. No. 11/782,573, filed Jul. 23, 2007, entitled "System and Methods For Automated Institutional Processing of Payments."

BACKGROUND OF THE INVENTION

Institutions can process requests from individuals in the traditional sense of having representatives speak to such individuals. In some cases, such a personal touch may be advantageous, but in other cases, where such individuals care about efficiency, time, and cost savings, it may not be, and automated processing systems may be desired in order to obtain immediate payments of funds upon requests. Thus, what is needed is systems, methods, computer readable media, and the like, for automated institutional processing of payments and the expeditious making of such payments per various institutional heuristics.

SUMMARY OF THE INVENTION

Various systems, methods, computer readable media, and the like, are provided for automated institutional processing of payments and the expeditious making of such payments. In one aspect of the presently disclosed subject matter, a transfer of funds can be made from one party to another party, whether such parties are communicating via stationary or mobile computing devices. Thus, funds can be transferred from one static account into a dynamically created transaction account. Such a transfer can have additional features, including the refunding of the transfer funds and revocation thereof.

In another aspect of the presently disclosed subject matter, insurance claims can be automatically processed by transferring funds when claims are filed (with or without evidentiary documents). Such transfers can then be validated afterwards. Thus, when claims are received, they can be quickly examined for the relevant fields, such as claim amount, and then the amount can be disbursed in a matter of minutes after receiving a claim submission. Such disbursement, moreover, can be governed according to various heuristics, including the trustworthiness of claimants and rules regarding maximum disbursement amounts.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed or shown. The following figures are included.

DETAILED DESCRIPTION OF ILLUSTRATIVE EMBODIMENTS

Overview

Various systems, methods, computer readable media, and the like are provided herein for automated institutional processing of payments. In some aspects of the presently disclosed subject matter, processing of fund requests is described where individuals can request and send funds using temporary accounts. In other aspects of the presently disclosed subject matter, processing of claim requests is described where individual can be automatically paid funds after filing a claim, and have their claims validated at some later point in time.

Figure 1:
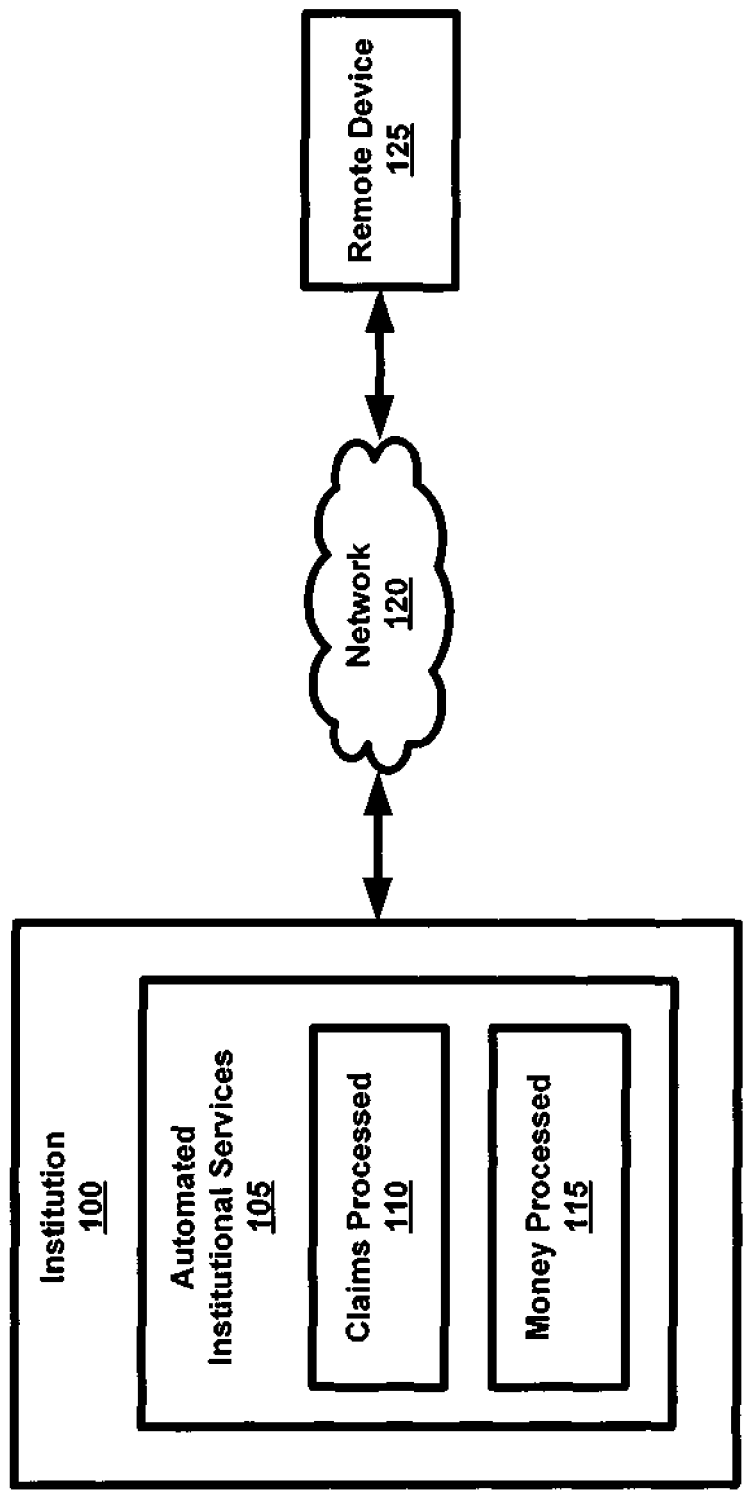
FIG. 1 illustrates a general architecture of various aspects of virtual banking, including virtual lockboxes and currency cards.

As FIG. 1 illustrates, an institution 100 may provide various services, including automated services 105. By way of example and not limitation, such services can include claim processing 110 and money processing 115. Thus, such institutions 100 can act as banks and/or insurance enterprises thereby gaining synergistic efficiencies from the cross pollination of such enterprises. Whether insurance claims or funds are involved, the services 110, 115 can be obtained via a network 120 linked to some remote device 125, be it a desktop, a laptop, a cell phone, personal digital assistant (PDA), or a plain landline telephone. These illustrated institutional services 110, 115 are, of course, merely exemplary and non-limiting. Those of skill in the art can readily appreciate other services that might be practices by financial and/or non-financial institutions.

It should be noted that the subject matter of the disclosed aspects herein is provided with specificity to meet statutory requirements. However, the Detailed Description itself is not intended to limit the scope of this disclosure. Rather, the inventors have contemplated that the claimed subject matter might also be embodied in other ways, to include different steps or elements similar to the ones described herein, in conjunction with other present or future technologies. Moreover, the description herein of systems, for example, applies also to methods, computer readable media, apparatuses, and the like.

Processing of Funds Requests

Figure 3:
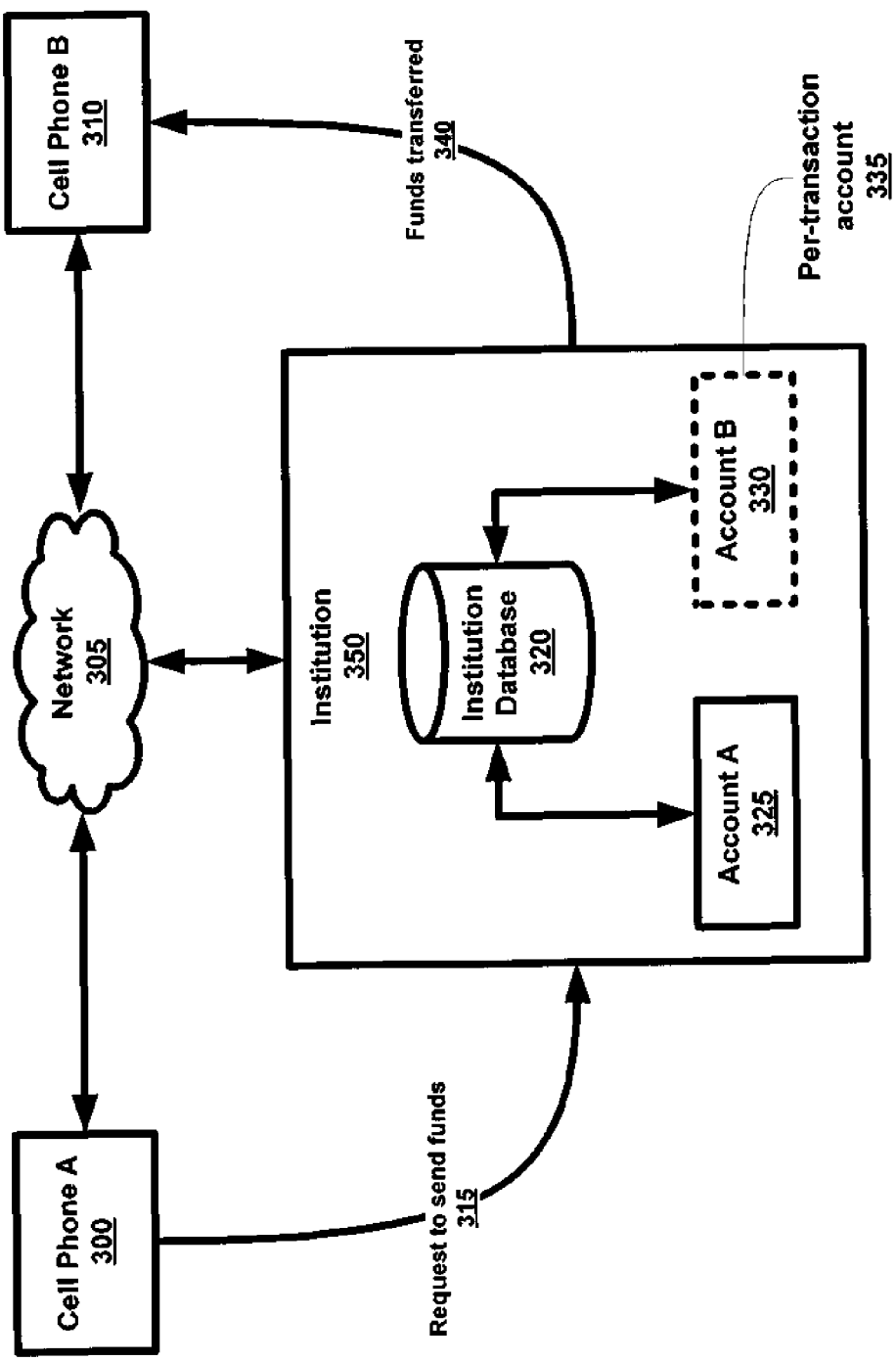
FIG. 3 provides an architectural view of the aspects discussed with reference to FIG. 2.

In one aspect of the present subject matter, the processing of funds requests is disclosed. For example, systems, methods, computer readable media, apparatuses, and the like are provided for automated institutional processing of payments of funds per user requests. As is shown in FIG. 3 that illustrates in block diagram form an exemplary and non-limiting aspect of such processing, at block 200, a subsystem (associated with some overall system) can receive a request from a first party to transfer funds to a second party. For example, a parent might want to transfer funds to a child, or an institution might want to transfer funds to a member. A party, thus, may be an individual, an institution, or any entity with the capability to make requests to transfer funds.

In one typical scenario, the child might ask the parent for funds via a mobile device, such as cell phone for instance, using a text message. And, the parent in turn might make a request to a bank to transfer funds to the child using his or her own cell phone, and hence complete a transaction of funds transfer. The term "transaction" herein denotes a set of actions related to at least some amount of money. Alternatively, institutions, such as financial institutions commonly embodied as banks, can transact with each other and transfer funds on behalf of individuals and/or various business organizations.

In any event, after the request of block 200, at block 202 a subsystem can accesses a first account associated with the first party and validate that sufficient funds are available in the first account. This first account may be maintained by the institution of which the first party is a member. Thus, the parent in the example above may text message his or her own bank and ask that the bank transfer funds to the child. However, in order to enable this transfer, a second account is needed. (In some alternative aspects of the present disclosure, the first account can be used by both the first party and the second party, but in the presently discussed aspect separate accounts are contemplated herein).

As block 204 indicates, this second account may be created as a per transaction account, where the request of block 200 is part of the transaction. This means that the per transaction account is created upon the request and it is temporary. In other words, the account can be created after the request and it can expire a predetermined amount of time after the request. In one implementation, the predetermined amount of time can last a day, a week, a month, or a year. But in any event, the per transaction account is different from a traditional account that does not have a predetermined expiration date. In fact, as the name suggests, the account is created for a transaction and its existence is determined by the nature of the transaction.

For example, money given by a parent to child to purchase groceries may mean that the per transaction account will last a day or two, but not months. Conversely, money given by a parent to the child to buy school books may mean that the per transaction account will last a quarter or a semester, but not years, and so on. In short, the length of existence of the per transaction account is a function of the purpose of the transfer of funds.

The per transaction account may be created by generating a temporary account number against which the second party can draw funds. The first party can provide this number to the second party, and the second party may use this account number (similarly to the way in which one party gives a credit card number to another party for charging purposes). There are numerous mechanisms for transferring such a temporary account number, including having the first party text message the account number to the second party (alternatively, the account number can be emailed, sent via instant messenger, and so on).

As block 206 shows, a central (or distributed) processing institution can create this per transaction account (or it may rely on the creation thereof by some third party), and then it can maintain control over this account. Such control may be exercised as a combination of rules specified by the first party (e.g. transfer a maximum of $500 per request; provide updates of expenditures of funds, etc.) and/or the institution (e.g. fund transfer over $100 are not insured).

Then, at block 208, another subsystem can transfer an amount associated with the request from the first account to the second per transaction account associated with the second party. In one aspect of the presently disclose subject matter, before such a transfer is complete, at a previous stage, namely at block 212, the availability of funds for transfer can be based on existing funds in the first account and/or on the line of credit given to the first party.

In various other aspects, as is shown at block 214, a further subsystem can refund any funds not spent above the amount transferred, so that money can be given from the second party back to the first party. Still in other aspects, a further subsystem can revoke the amount transferred from the first account to the second account based on a first party revoke request. In other words, in the parent example above, a parent may revoke a funds transfer to the child per a request, whether such a request is made ad hoc (dynamically) or whether it is based on some (static) rule.

Lastly, at block 210, once the transfer is complete and after some specified time has gone by, the per transaction account can terminate. Next time another request is made, a new per transaction account with a new number can be created. This will bolster fund transfer security. Whether such a per transaction account number is predetermined or randomly generated is implementation dependent. In the latter case, it may be the traditional sixteen digit number or it may be some longer number. The chances that such a random number would be generated for two different parties during the same period of time (during a transaction) would be astronomical and hence of no concern herein. However, various conflict resolution mechanisms could be used in case a conflict had occurred.

Figure 2:
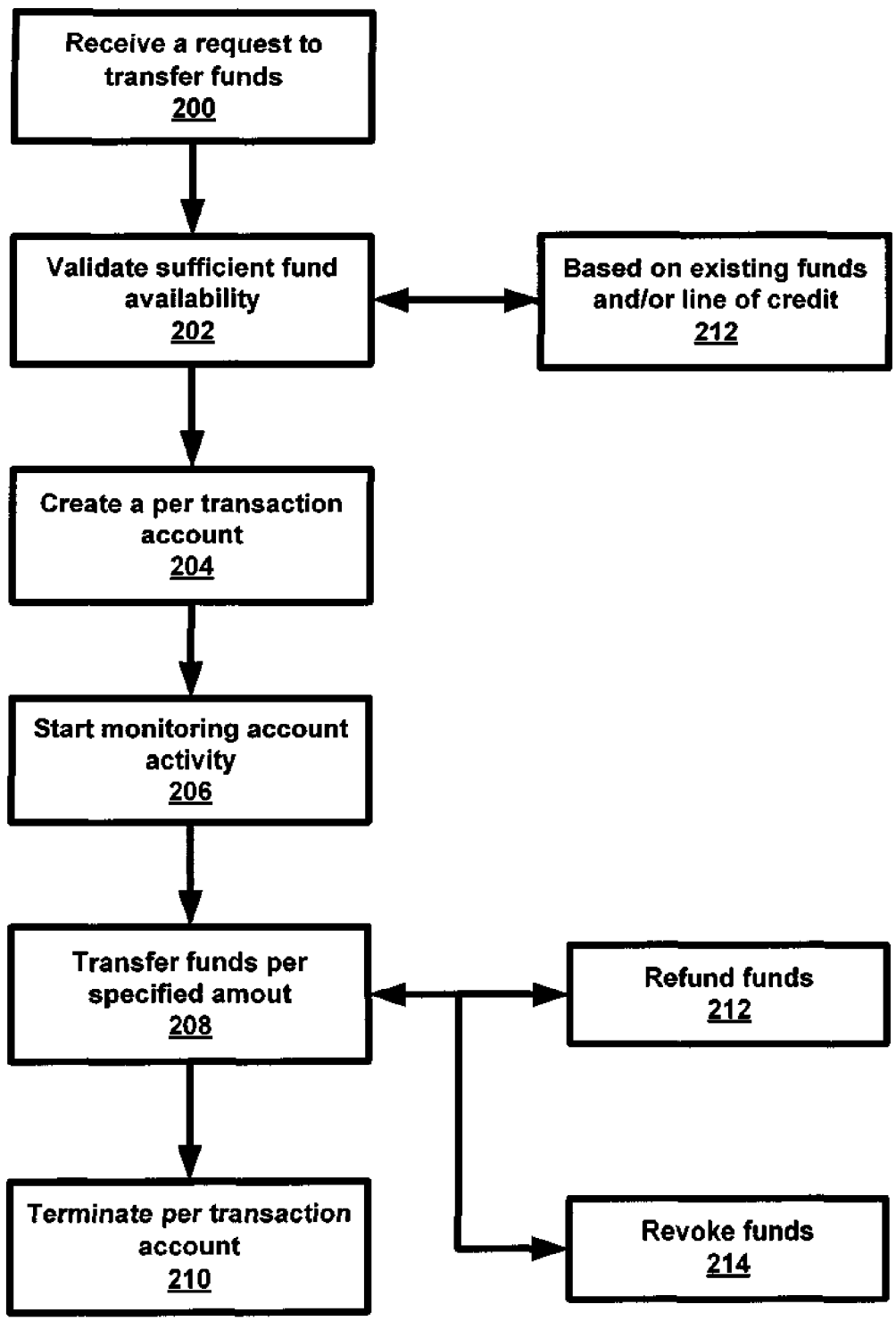
FIG. 2 provides a block diagram flow chart of how automated claim settlements may be implemented and/or used.

FIG. 3 provides an architectural view of the aspects discussed with reference to FIG. 2. Thus, a first party using a cell phone A 300 can request to send funds 325 to some second party with cell phone B 310 via a network 305 (whether a LAN, WAN, POTS, wireless, etc.). Such a request can be made via a text message to an institution 350 (or the request can be made by actually calling the institution or sending an email or instant message). Then, a confirmation of transferred funds 340 can be provided to the second party's computing device 310. It should be noted that even though cell phones 300, 310 are depicted, any other computing devices can be used, such as desktop computers, laptops, personal digital assistants (PDAs), and so on—as is explained in more detail below.

Once the institution 350 receives the request 315, it can process it by examining the account 325 against which funds will be drawn (or the fund where funds will be deposited by the second party for the benefit of the first party). As was already explained above, after a funds availability examination and other protocols are observed, the funds can be actually transferred to a per transaction account. This account can be created any time after the actual request is made 315 (alternatively, it can be created beforehand if such a request is anticipated based on some heuristic).

Thus, FIG. 3 illustrates that some institutional database 320 can relate account. A 325 to account B 330 and help in transferring of the funds. Once this is done, a confirmation message can be send to the device 310 of the beneficiary. And, at this point, the transfer transaction can last until some specified period of time until the per transaction account 330 expires. Thus, multiple acts (i.e. transfers, refunds, etc.) can occur during any given transaction.

Processing of Claim Requests

Figure 4:
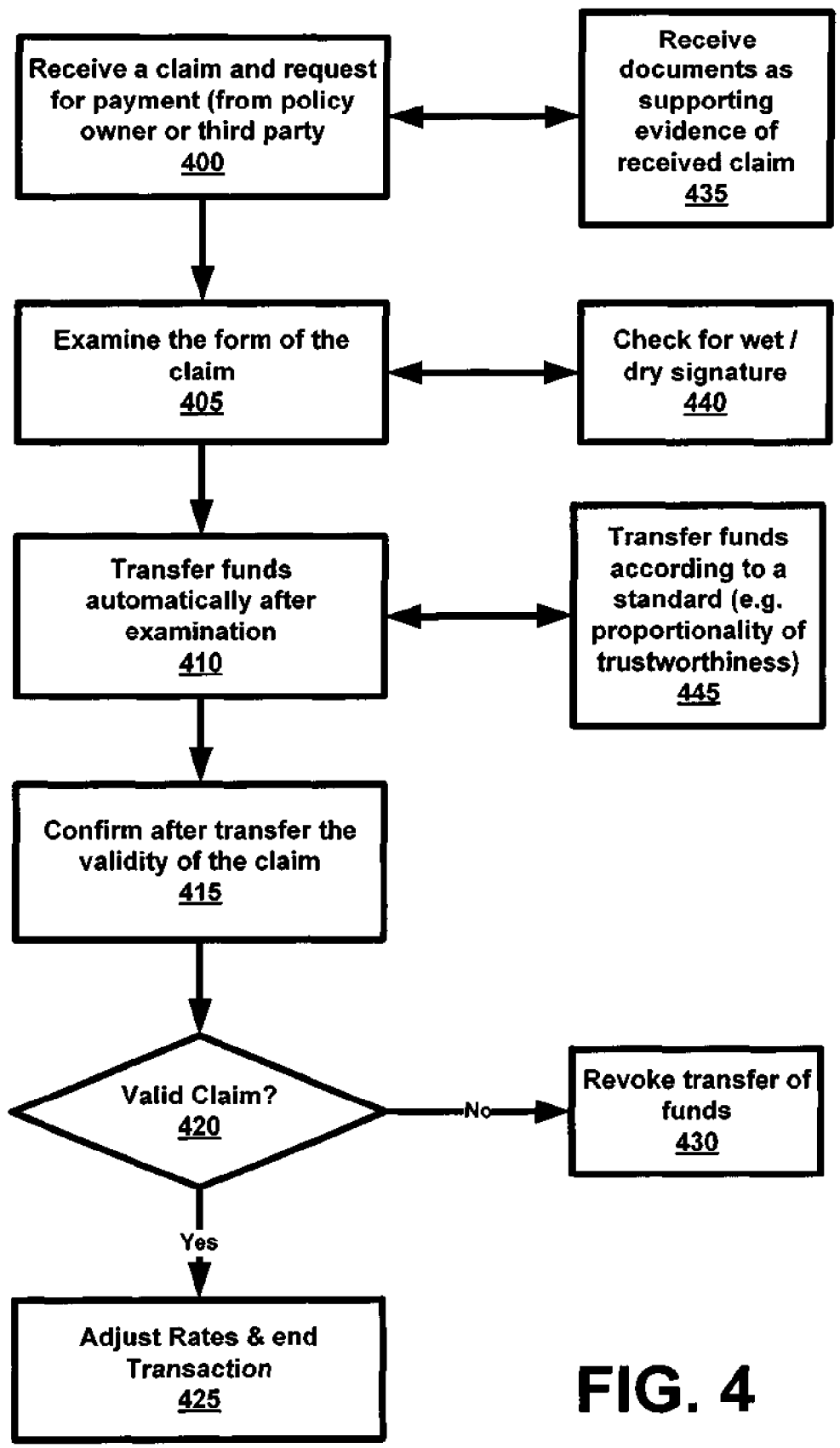
FIG. 4 provides a block diagram flow chart of how submitted claims can be processed and payments can be automatically disbursed.

In a different aspect of the present subject matter, the processing of claims is disclosed. For example, a system for automated institutional processing of claims is shown in FIG. 4. At block 400, the system has a subsystem that receives digitized insurance claims from various users. Such claims can be scanned in by the users and submitted on standard claim forms. They can be received in various formats, from various locations and devices, and for various different matters. For example, one user cam submit a home insurance claim from California in PDF format, while another user (or the same user) can submit a car insurance claim from New York in HTML format. However such claims are submitted, they can be received by the subsystem and stored for processing.

Moreover, as block 435 shows, evidentiary documents can also be received by the subsystem. Such documents, whether sworn affidavits, pictures, recordings (video and/or audio), etc., can supplement the veracity of any submitted claim. These documents likewise can be submitted in digitized form in various formats and for various purposes. In fact, such evidentiary documents may be stored as a basis for multiple claims, if such claims are germane to the documents. In some aspects, for privacy purposes, these documents can be destroyed after some period of time; in other aspects, these documents can be retained for profiling purposes and historical data mining.

The first step in processing a claim may be examining at least one field in the claim form per block 405 in FIG. 4. The form itself may have various fields, including the user's name, address, social security number, and the like. However, in one aspect of the presently disclosed subject matter, one specific field can be examined, such as the claim amount field, and a determination can be made based only on this field. Thus, for example, a rule can be implemented where claims for $500 or less are automatically paid without at first examining the claim in detail (nor any evidentiary documents). Of course, at some point such claims and documents may be examined and any payments may be verified (or, if such claims were invalid, the payments may be rescinded).

Other fields can also be examined. In exemplary aspect, users may attach wet signatures to their claim forms and/or documents. Thus, users can physically sign forms and documents and they can be scanned in by the receiving institution as they are received. Alternatively, dry signatures can be used if submissions are provided in digital form. In either case, such fields and other relevant fields are examined in order to prepare payments on the claims.

Next, at block 410, once all the relevant fields have been examined, automatic transfer of funds can occur. Such automatic transfer of funds can mean that funds are transferred from one account to another account at the same institution, or in other aspects, that funds are transferred from one account to another account at a different institution. In the former case, it may be easier to revoke transfer of funds if the received claims are later found to be invalid or otherwise improper. However, in any case, funds can be transferred directly into another account, or in other aspects, they may be placed in an escrow account pending the resolution and/or validation of a claim.

As block 445 indicates, the transfer of funds may be made according to various standards and/or heuristics. By way of example and not limitation, the amount of money transferred can be made in some proportion to the level of trustworthiness of the beneficiary user (whether linear or nonlinear proportion). Thus, if one user has a long established relationship with the insurance institution, that user can receive funds instantaneously. However, if another user is new or has submitted dubious claims in the past, automatic transfer of funds for such a user may be disallowed.

The notion of trustworthiness may depend not only the length of the relationship with an institution or past history of claim submissions, but also on the status of users in society and their relationship to the insuring institution. Users with good credit rating and with armed service experience may be deemed as having, based on empirical evidence, a higher level of trustworthiness than users with an opposite history. Thus, not only the history but the present and future prospects of a user may impinge on whether automatic payment of funds is received from an insuring institution.

Since one goal of the presently disclosed subject matter is to provide quick payment on a given claim, the payment may be made before the claim is examined in great detail (i.e. the payment may be made when only the relevant fields, discussed above, have been examined). However, after the payment is made, a claim confirmation process can begin. This process can examine, either using computing devices and/or individuals, the submitted claims and evidentiary documents (however, it should also be noted that such documents can be quickly examined even before any transfer of funds occurs). Thus, at block 415, another subsystem confirms the validity of the originally received claim. Such validity can be based on various heuristics and standards established by each individual insurance institution (and/or industry standards may be used).

At block 420, if the claim was valid then the transaction can end, as shown at block 425. But, before (or after) the ending, rates for the individual may be adjusted, where any adjustments may take into account the received claim. On the other hand, at block 420, if the claim ends up being invalid, then at block 430 the transfer of funds may be revoked. Such revocation could mean that money is transferred from the receiving account and back into the sending account (especially if both accounts are maintained by the same institution). Alternatively, the claimant's account can be charged with the sum that the claimant received from the insuring institution.

Although various aspects herein described users, such users may not only be owners of insurance policies but also authorized third parties. Such third parties can submit claim forms and/or evidentiary documents on behalf of policy owners making a claim. Likewise, although various subsystem were discussed, which could be implemented as various computing devices explained in great detail, below, the present aspects could also be practiced as methods and be constructed as instructions on computer readable media.

Figure 5:
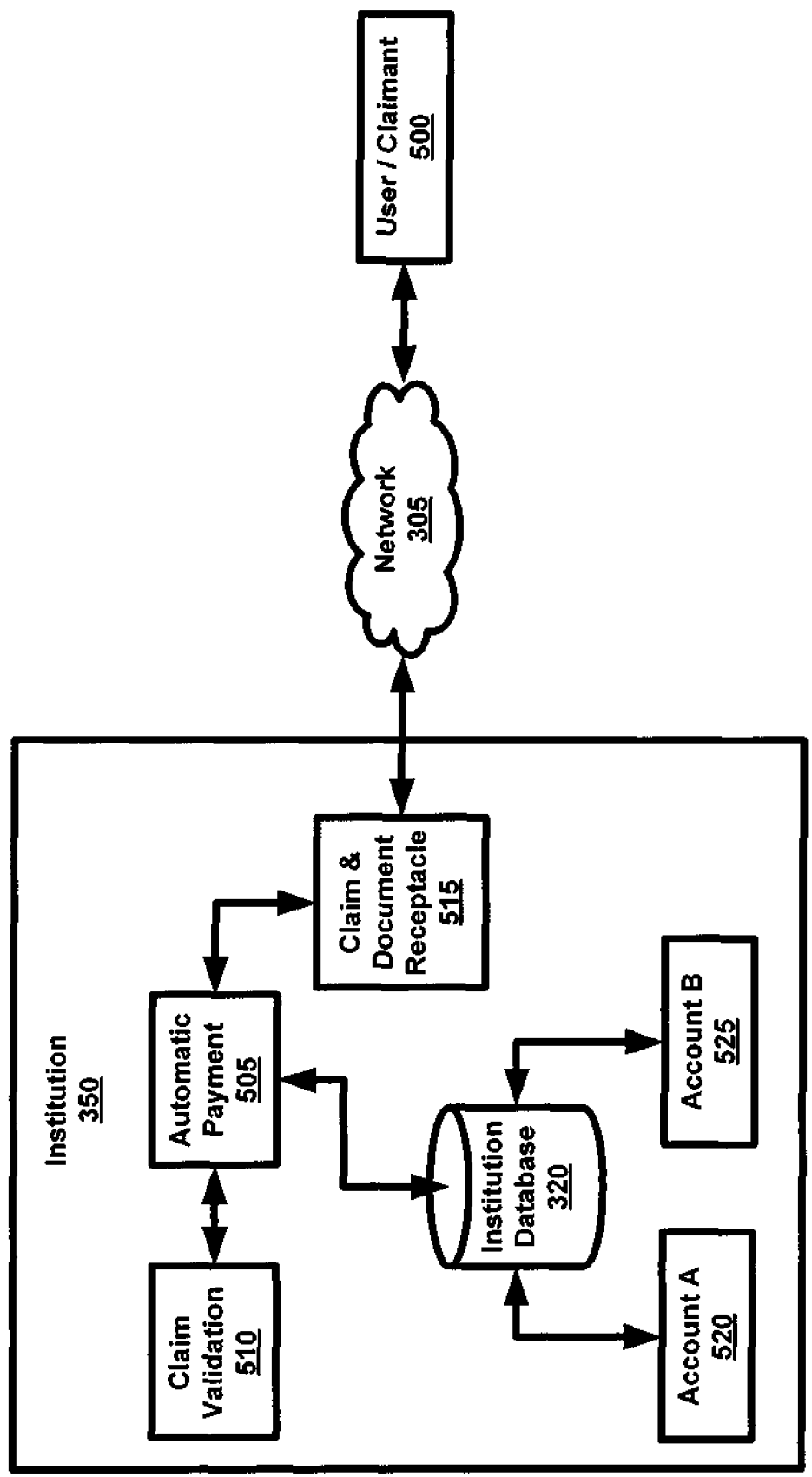
FIG. 5 provides an architectural perspective of the subject matter discussed with reference to FIG. 4.

FIG. 5 provides an architectural vantage point for the various aspects discussed above. An institution 350, such as the one shown in FIG. 3, can have a claim and/or document receptacle 515 for receiving claim forms and any supporting evidentiary documents. Such contents can be send via some network (LAN, WAN, POTS) from a user/claimant 500. Upon receipt at the receptacle 515, an assessment of the claim form and any relevant fields can be made and automatic payment can be issued by an automatic payment module 505. Such payment may include, in one exemplary and non-limiting aspect, accessing an institutional database 320 relating users and accounts and transferring money between accounts (say, from the institution account 520 to the user account 525). Of course, funds can also be transferred from/to other accounts outside institution 350. Once the funds are transferred, a claim validation module 510 can validate the automatic payment preformed beforehand—per the discussion above.

Exemplary Computing and Networking Environment

Figure 6:
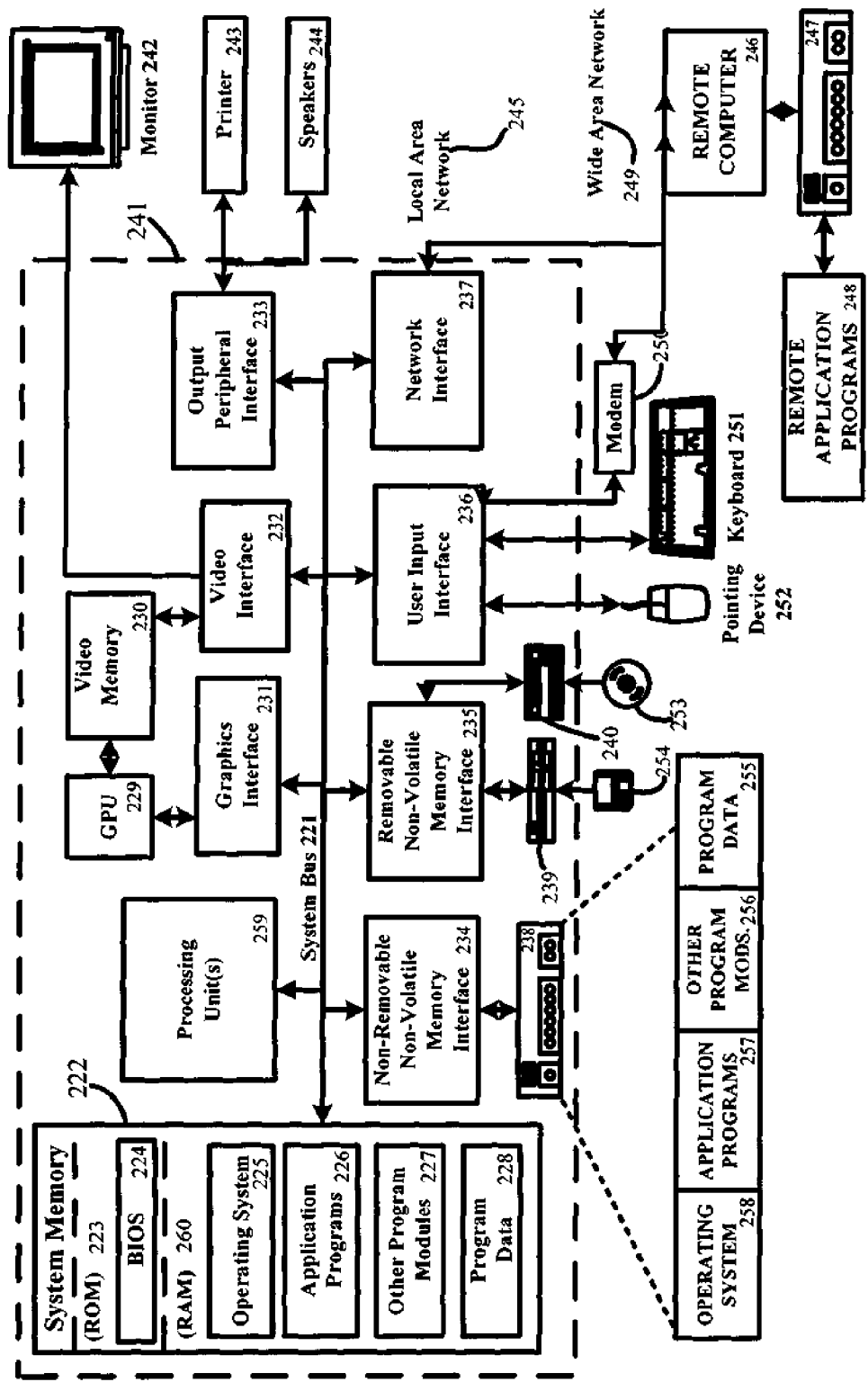
FIG. 6 illustrates exemplary and non-limiting computing devices (and components thereof) that can be used with the aspects disclosed herein.

Referring to FIG. 6, shown is a block diagram representing an exemplary computing device suitable for use in conjunction with implementing the systems, methods, and computer readable media described above. For example, computer executable instructions are provided that carry out the processes and methods for automatic payments from institutions. They may reside and/or be executed in such a computing environment as shown in FIG. 6. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 6 illustrates operating system 225, application programs 226, other program modules 227, and program data 228.

The computer 241 may also include other removable/non-removable, volatile/nonvolatile computer storage media. By way of example only, FIG. 6 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 6, provide storage of computer readable instructions, data structures, program modules and other data for the computer 241. In FIG. 6, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 65. The logical connections depicted in FIG. 6 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example and not limitation, FIG. 6 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 6, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 7:
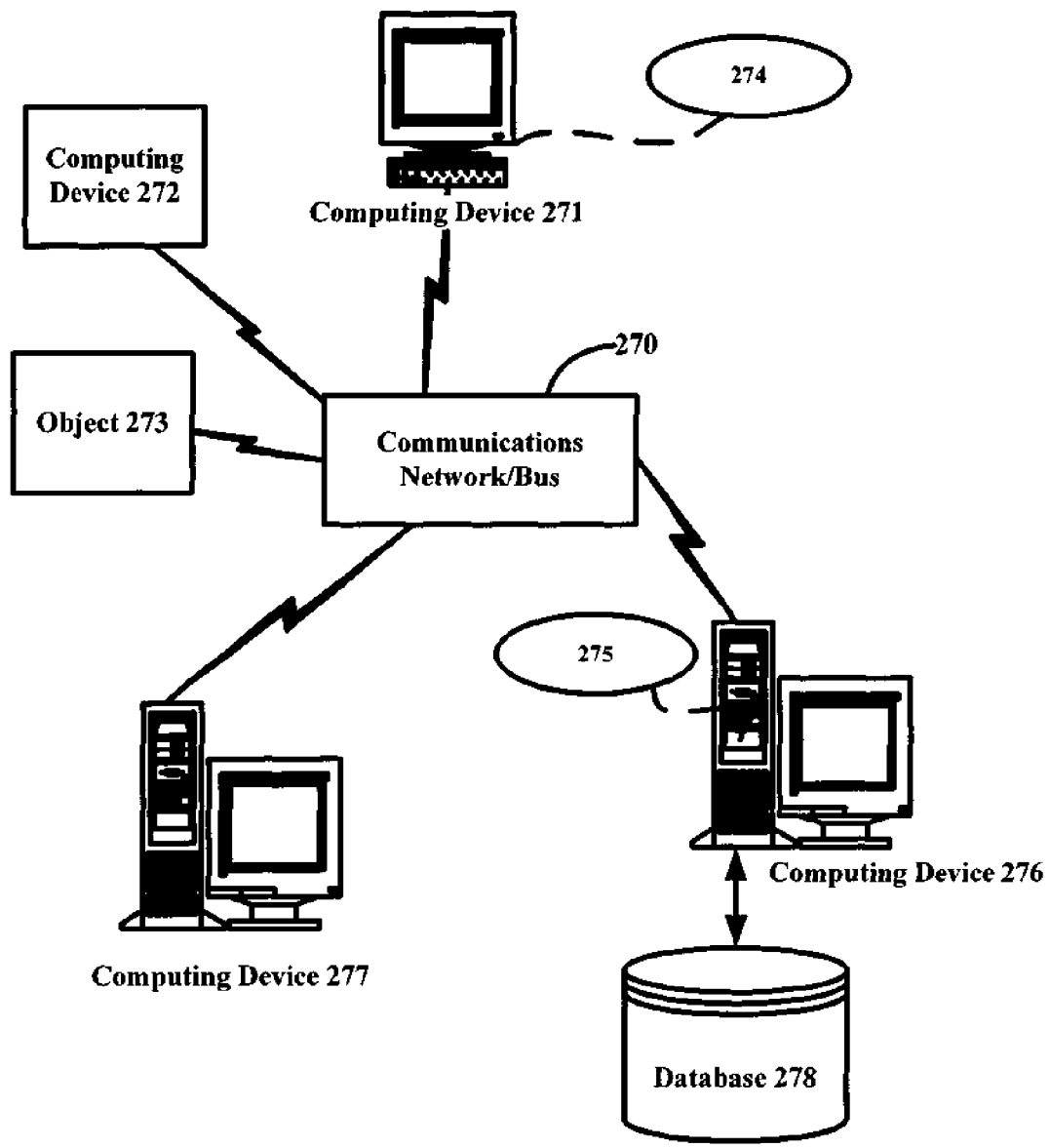
FIG. 7 illustrates exemplary and non-limiting networking devices (and components thereof) that can be used with the aspects disclosed herein.

Referring next to FIG. 7, shown is an exemplary networked computing environment in which many computerized processes may be implemented to perform the processes described above. For example, parallel computing may be part of such a networked environment with various clients on the network of FIG. 7 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 7 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 7, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 7 and the further diversification that can occur in computing in a network environment such as that of FIG. 7, the systems, methods and computer readable media provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, processes and methods were described for automatic payment of funds by various kinds of institutions. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for automated institutional processing of claims, comprising:
   a receiving computing device that receives a digitized insurance claim form from a user;
   an examination unit, including a first processor and a first memory coupled to the first processor, that examines at least one field in said claim form;
   an electronic transfer system that automatically opens a user account associated with the user upon indication from the examination unit that automatic payment will be made, and automatically transfers funds to the user account associated with said user upon examination of said at least one field by the examination unit, wherein the electronic transfer system grants access to the user account by both said user and an insurance company that provides the funds for the user account;
   a confirmation unit, including a second processor and a second memory coupled to the second processor, that confirms, after said transfer of funds, a validity of a claim made in said claim form;
   at least one subsystem that transfers said funds in proportion to a level of trustworthiness in a profile of said user, wherein the level of trustworthiness is determined using at least one of length of relationship with an institution, history of dubious claims, a credit rating, and armed service record; and
   at least one subsystem that revokes said funds in the user account back to an institutional account.

2. The system of claim 1, wherein the first processor is the same as the second processor, wherein the first memory is the same as the second memory, and wherein the examination unit checks said claim form for a signature.

3. The system of claim 1, wherein the receiving computing device receives at least one document supportive of said claim form.

4. The system of claim 1, wherein said funds are revoked when said confirming results in a deficient claim form.

5. The system of claim 1, further comprising at least one subsystem that updates an adjusted insurance rate for said user based on at least said received claim form.

6. A method for automated institutional processing of claims, comprising:
   receiving, by a computer system, a digitized insurance claim form from a user;
   examining, by the computer system, at least one field in said claim form;
   opening, in a database, a user account associated with the user upon examination of said at least one field indicating automatic payment;

granting access to the user account by both the user and the institution for withdrawal of funds;
automatically electronically transferring the funds from an institutional account to the user account associated with said user upon examination of said at least one field;
receiving, in a computer, a confirmation, after said transfer of funds, of a validity of a claim made in said claim form;
retrieving a level of trustworthiness from the database in a profile of said user stored in the computer system at the institution;
transferring said funds in proportion to the level of trustworthiness, wherein the level of trustworthiness is determined using at least one of length of relationship with an institution, history of dubious claims, a credit rating, and armed service record; and
revoking said funds in the user account back to the institutional account.

7. The method of claim 6, further comprising checking said claim form for a signature.

8. The method of claim 6, further comprising receiving at least one document supportive of said claim form.

9. The method of claim 6, wherein said funds are revoked when said confirming results in a deficient claim form.

10. The method of claim 6, further comprising updating an adjusted insurance rate for said user based on at least said received claim form.

11. A non-transitory, computer-readable medium storing thereon computer-executable instructions for automated institutional processing of claims, comprising:
at least one instruction that receives a digitized insurance claim form from a user;
at least one instruction that examines at least one field in said claim form;
at least one instruction to open a user account upon indication from the examining instruction;
at least one instruction to grant access for withdrawal of funds to the user account by both the user and an institution;
at least one instruction that automatically transfers the funds to the user account upon examination of said at least one field;
at least one instruction that confirms, after said transfer of funds, a validity of a claim made in said claim form;
at least one instruction that transfers said funds in proportion to a level of trustworthiness in a profile of said user; and
at least one instruction that revokes said funds in the user account back to an institutional account.

12. The non-transitory, computer-readable medium of claim 11, further comprising at least one instruction that checks said claim form for a signature.

13. The non-transitory, computer-readable medium of claim 11, further comprising at least one instruction that receives at least one document supportive of said claim form.

14. The non-transitory, computer-readable medium of claim 11, wherein said funds are revoked when said confirming results in a deficient claim form.

15. The non-transitory, computer-readable medium of claim 11, further comprising at least one instruction that updates an adjusted insurance rate for said user based on at least said received claim form.

16. A method for automated institutional processing of claims, comprising:
receiving, by a computer system, a digitized insurance claim form from a user;
examining, by the computer system, at least one field in said claim form;
opening, in a database, a user account associated with the user upon examination of said at least one field indicating automatic payment;
granting access to the user account by both the user and the institution for withdrawal of funds;
automatically electronically transferring the funds from an institutional account to the user account associated with said user upon examination of said at least one field;
receiving, in a computer, a confirmation, after said transfer of funds, of a validity of a claim made in said claim form, wherein the user account is in a same institution as the institutional account; and
revoking said funds in the user account back to the institutional account.

17. The method of claim 16, further comprising checking said claim form for a signature.

18. The method of claim 16, further comprising receiving at least one document supportive of said claim form.

19. The method of claim 16, wherein said funds are revoked when said confirming results in a deficient claim form.

20. The method of claim 16, further comprising updating an adjusted insurance rate for said user based on at least said received claim form.

* * * * *